US006899207B2

(12) United States Patent
Deferme et al.

(10) Patent No.: US 6,899,207 B2
(45) Date of Patent: May 31, 2005

(54) EXTRA SUPPORT AREA FOR VALVE DISC

(75) Inventors: Stefan Deferme, Heusden-Zolder (BE); Jean-Marie Tuts, Wellen (BE); Gert Mangelschots, Heusden-Zolder (BE); Patrick Vanmechelen, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/674,161

(22) Filed: Sep. 29, 2003

(65) Prior Publication Data

US 2005/0067238 A1 Mar. 31, 2005

(51) Int. Cl.[7] .............................................. F16F 9/348
(52) U.S. Cl. ............................ 188/282.5; 188/282.6; 188/322.14
(58) Field of Search ....................... 188/282.5, 322.14, 188/322.13, 322.15, 322.19, 322.22, 282.6

(56) References Cited

U.S. PATENT DOCUMENTS

| | | |
|---|---|---|
| 3,550,616 A | 12/1970 | Graham |
| 3,572,377 A | 3/1971 | Graham et al. |
| 4,782,925 A | 11/1988 | Grundei |
| 5,042,624 A | 8/1991 | Furuya et al. |
| 5,085,300 A * | 2/1992 | Kato et al. ............... 188/282.6 |
| 5,115,892 A | 5/1992 | Yamaoka et al. |
| 5,219,414 A | 6/1993 | Yamaoka |
| 5,325,942 A | 7/1994 | Groves et al. |
| 5,424,398 A | 6/1995 | Middeldorp et al. |
| 5,813,500 A | 9/1998 | Deferme |
| 6,382,372 B1 * | 5/2002 | Keil et al. ............. 188/322.15 |
| 6,672,436 B1 * | 1/2004 | Keil et al. ............. 188/322.14 |

* cited by examiner

Primary Examiner—Robert A. Siconolfi
Assistant Examiner—Melanie Torres
(74) Attorney, Agent, or Firm—Harness, Dickey & Pierce, PLC

(57) ABSTRACT

A valve for controlling fluid flow through a passage defined by a valve body or a piston includes a valve disc which abuts the valve body or the piston. The valve body or the piston defines a first land for supporting the valve disc, a second land for supporting the valve disc located radially inward from the first land and a support surface for the valve disc located between the first and second lands. This valve disc abuts the first and second lands and a clearance is defined between the valve disc and the support surface.

20 Claims, 5 Drawing Sheets

EXTRA SUPPORT AREA FOR VALVE DISC

FIELD OF THE INVENTION

The present invention relates generally to shock absorbers having a unique check valve assembly for use with a base valve assembly or a piston valve assembly. More particularly, the present invention relates to a shock absorber having a check valve assembly which includes an additional area on the valve body to support and protect a valve disc against damage due to high fluid pressures.

BACKGROUND OF THE INVENTION

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the spring mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

In applications where a low level of flow restriction is a priority for the check valve assemblies, the working surface for lifting the check valve disc must be maximized. In addition, this low flow restriction level also calls for a very lightweight disc. When first reviewing the design for the check valve assembly, it may seem logical to utilize a valve spring, which has a low stiffness. This design choice is overruled by the need for a fast closing check valve assembly, as well as the need to avoid "chuckle" noise when the shock absorber is mounted on the vehicle.

As the check valve disc becomes lighter and thinner, and the area of the check valve disc which is acted upon by fluid pressure becomes greater, the check valve disc becomes very sensitive to the high fluid pressure which urges the check valve assembly into its closed position.

The continued development of check valve assemblies has been directed towards reducing the level of flow restriction without compromising the sensitivity of the check valve assembly to the high pressure fluid which urges the check valve assembly into its closed position.

SUMMARY OF THE INVENTION

The present invention provides the art with a valve body which includes a surface or support area that supports the check valve disc. The surface or support area is designed to distribute the load from the high pressure fluid over a greater surface area, instead of just two lands to reduce the unsupported span of the disc. In order to maximize the working surface which reacts to open the check valve assembly, a clearance is provided between the surface or support area and the check valve disc.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
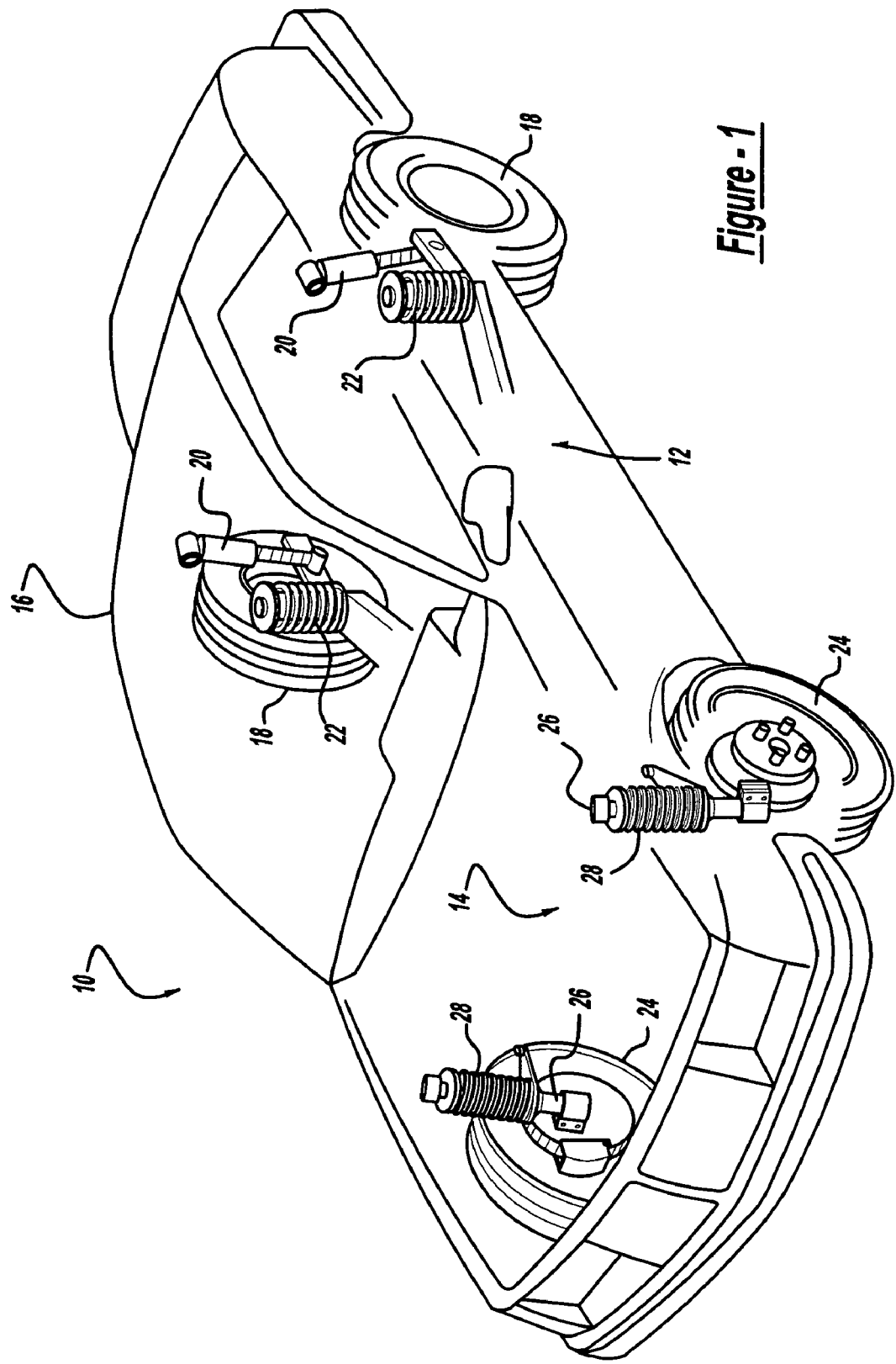
FIG. 1 is a schematic representation of a typical automobile which incorporates the unique base valve assembly in accordance with the present invention.

Referring now to the drawings in which like reference numerals designate like or corresponding parts throughout the several views, there is shown in FIG. 1 a vehicle which includes a suspension system incorporating the unique shock absorbers in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
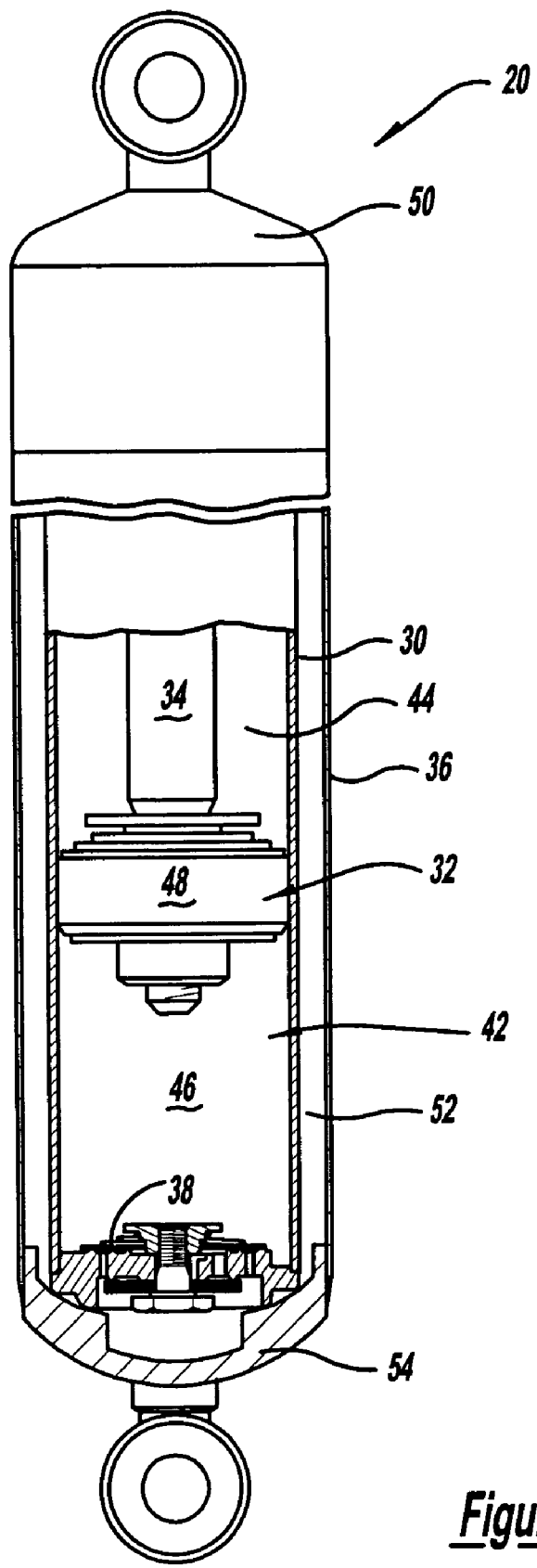
FIG. 2 is a side sectional view of the shock absorber in accordance with the present invention.

Referring now to FIG. 2, shock absorber 20 is shown in greater detail. While FIG. 2 illustrates only shock absorber 20, it is to be understood that shock absorber 26 also includes the unique valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through upper end cap 50 which closes the upper end of pressure tube 30. A sealing system seals the interface between upper end cap 50, reserve tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
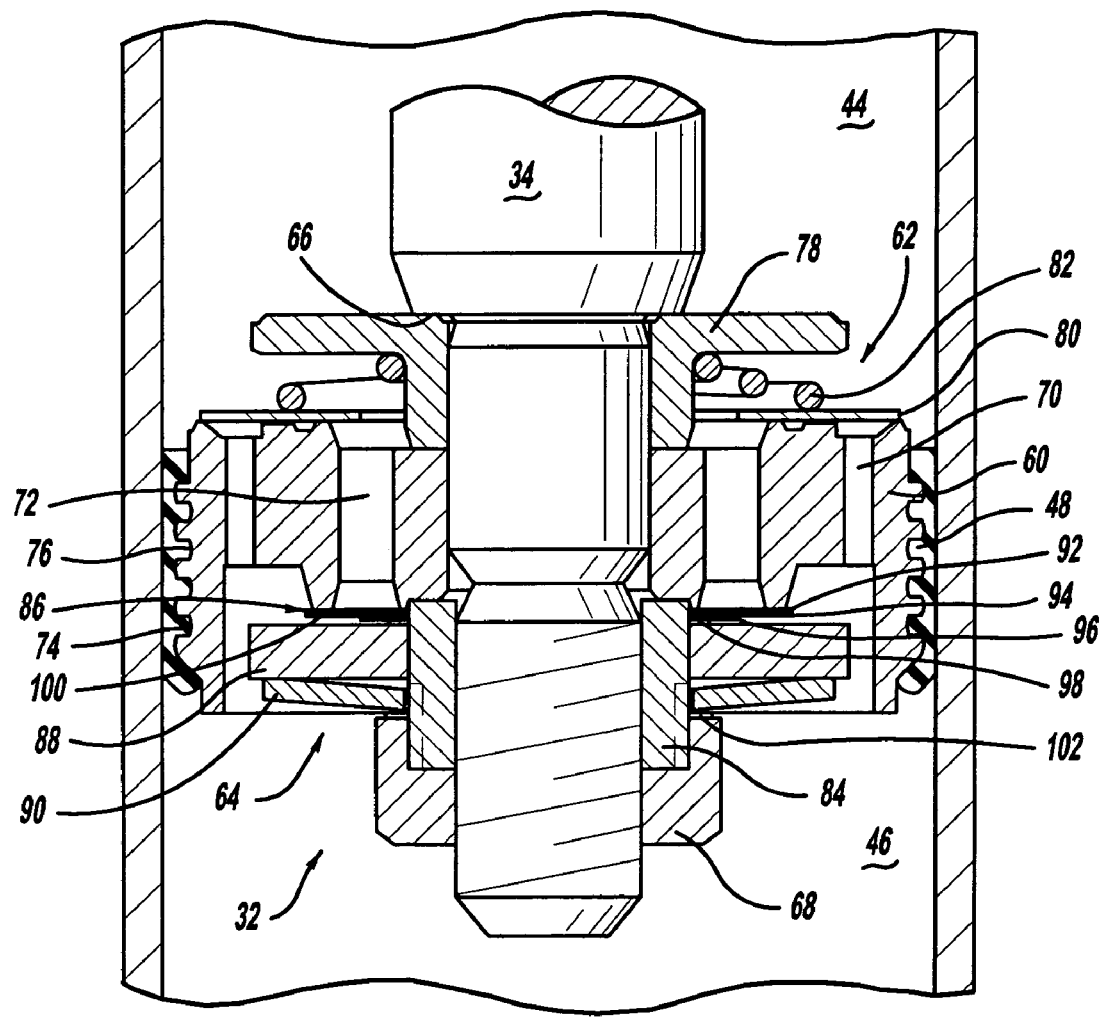
FIG. 3 is an enlarged cross-sectional view of the piston assembly in accordance with the present invention.

Referring now to FIG. 3, piston assembly 32 comprises a valve body 60, a compression check valve assembly 62 and a rebound valve assembly 64. Compression check valve assembly 62 is assembled against a shoulder 66 on piston rod 34. Valve body 60 is assembled against compression check valve assembly 62 and rebound valve assembly 64 is assembled against valve body 60. A nut 68 secures these components to piston rod 34.

Valve body 60 defines a plurality of compression passages 70 and a plurality of rebound passages 72. Seal 48 includes a plurality of ribs 74 which mate with a plurality of annular grooves 76 to permit sliding movement of piston assembly 32.

Compression check valve assembly 62 comprises a retainer 78, a valve disc 80 and a spring 82. Retainer 78 abuts shoulder 66 on one end and valve body 60 on the other end. Valve disc 80 abuts valve body 60 and closes compression passages 70 while leaving rebound passages 72 open. Spring 82 is disposed between retainer 78 and valve disc 80 to bias valve disc 80 against valve body 60. During a compression stroke, fluid in lower working chamber 46 is pressurized causing fluid pressure to react against valve disc 80. When the fluid pressure against valve disc 80 overcomes the biasing load of spring 82, valve disc 80 separates from valve body 60 to open compression passages 70 and allow fluid flow from lower working chamber to upper working chamber. Typically spring 82 only exerts a light load on valve disc 80, and it does not contribute to the damping characteristics for shock absorber 20. The damping characteristics for shock absorber 20 during a compression stroke are controlled by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a spacer 84, a plurality of valve discs 86, a retainer 88 and a Belleville spring 90. Spacer 84 is threadingly or slidingly received on piston rod 34 and is disposed between valve body 60 and nut 68. Spacer 84 retains valve body 60 and compression check valve assembly 62 while permitting the tightening of nut 68 without compressing either valve disc 80 or valve discs 86. Retainer 78, valve body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut valve body 60 to close rebound passages 72 while leaving compression passages 70 open. Retainer 88 is also slidingly received on spacer 84 and it abuts valve discs 86. Belleville spring 90 is assembled over spacer 84 and is disposed between retainer 88 and nut 68 which is threadingly received on spacer 84. Belleville spring 90 biases retainer 88 against valve discs 86 and valve discs 86 against valve body 60. The plurality of valve discs 86 comprise a bleed disc 92, a valve disc 94, a spacer disc 96 and a fulcrum disc 98. Bleed disc 92 includes at least one slot 100 which permits a limited amount of bleed flow bypassing rebound valve assembly 64. Fulcrum disc 98 provides a fulcrum or bending point for bleed disc 92, valve disc 94 and spacer disc 96. When fluid pressure is applied to discs 92 and 94, they will elastically deflect at the outer peripheral edge of spacer disc 96 and fulcrum disc 98 to open rebound valve assembly 64. A shim 102 is located between nut 68 and Belleville spring 90 to control the preload for Belleville spring 90 and thus the blow off pressure as described below. Thus, the calibration for the blow off feature of rebound valve assembly 64 is separate from the calibration for compression check valve assembly 62.

During a rebound stroke, fluid in upper working chamber 44 is pressurized causing fluid pressure to react against valve discs 86. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for shock absorber 20 in rebound. Prior to the deflection of valve discs 86, a controlled amount of fluid flows from upper working chamber 44 to lower working chamber 46 through slot 100 to provide low speed tunability. When the fluid pressure within upper working chamber 44 reaches a predetermined level, the fluid pressure will overcome the biasing load of Belleville spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
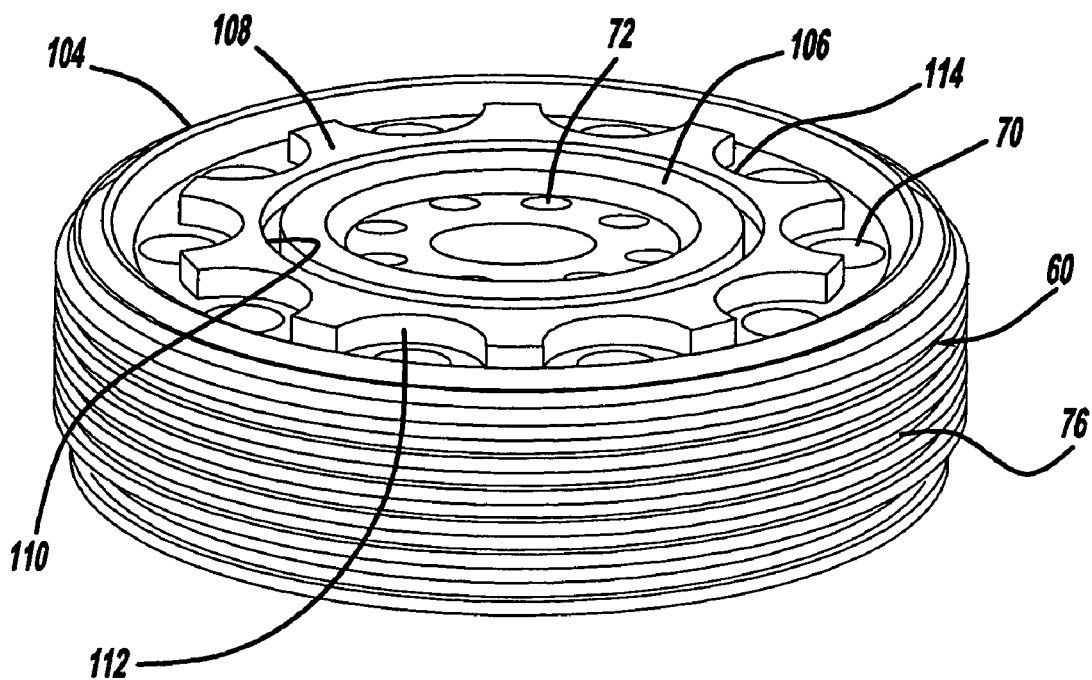
FIG. 4 is a perspective view of the piston in the compression check valve assembly shown in FIG. 3.

Referring now to FIGS. 3 and 4, compression check valve assembly 62 is designed to provide a low restriction to the flow of fluid from lower working chamber 46 to upper working chamber 44, and it is designed to maximize the working surface for lifting valve disc 80. Valve body 60 defines a first or outer land 104, a second or inner land 106, and a support surface 108 disposed between outer land 104 and inner land 106. Support surface 108 is defined by an inner diameter 110, which is adjacent inner land 106, and a scalloped outer surface 112, which defines a plurality of indentations 114 which partially surround each of the plurality of rebound passages 72, to maximize the surface area of support surface 108. Valve disc 80 is biased by spring 82 against outer land 104 and inner land 106. A clearance is provided between support surface 108 and valve disc 80. This clearance maximizes the working surface during the compression stroke by allowing fluid pressure in lower working chamber 46 to react against the surface area of valve disc 80, which is between outer land 104 and inner land 106. This provides for a low level of intake restriction for compression check valve assembly 62. During a rebound stroke, fluid pressure within upper working chamber 44 reacts against the upper surface of valve disc 80. Due to valve disc 80 being designed thin to reduce its weight, valve disc 80 will deflect in the area between outer land 104 and inner land 106 to contact support surface 108, which provides additional support for valve disc 80. Support surface 108 supports valve disc 80 during the rebound stroke to minimize the unsupported span of valve disc 80 by distributing the load over lands 104 and 106, as well as the entire surface area of support surface 108.

Figure 5:
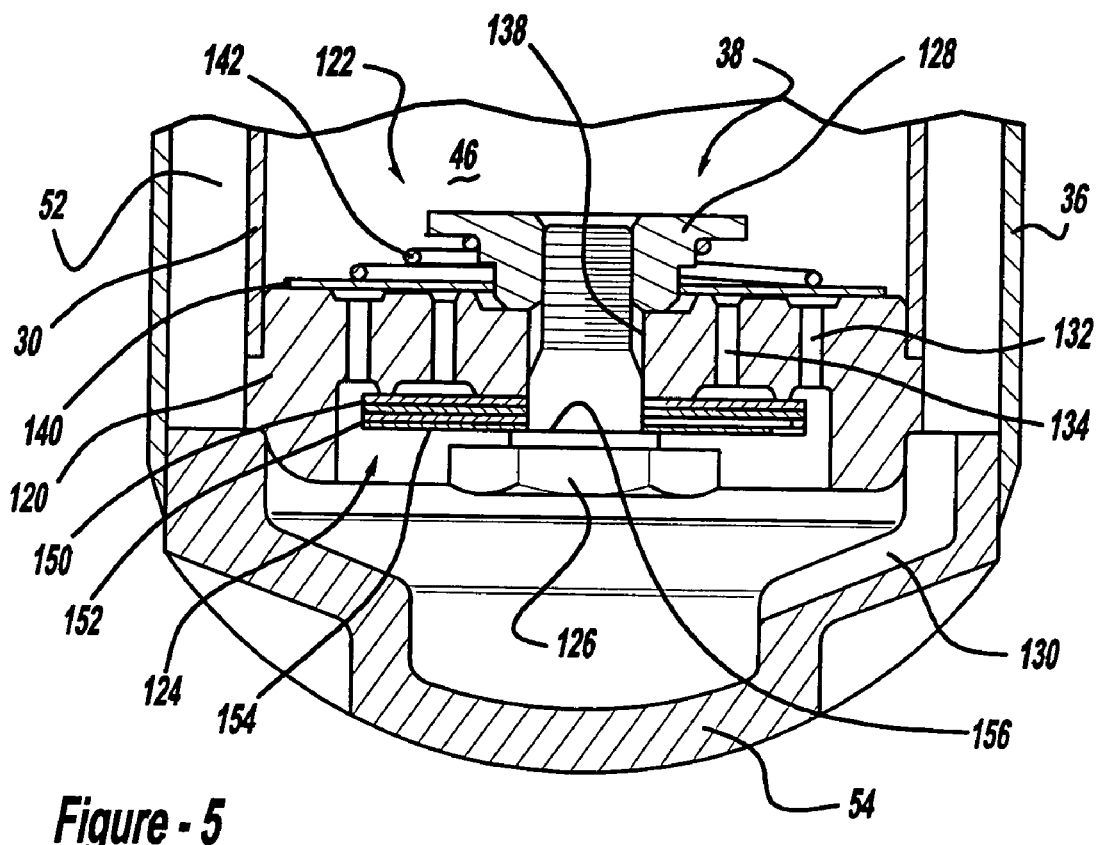
FIG. 5 is an enlarged cross-sectional view of the base valve assembly in accordance with the present invention.

Referring now to FIG. 5, base valve assembly 38 comprises a valve body 120, an intake or rebound check valve assembly 122, a compression valve assembly 124, a retaining bolt 126 and a retaining nut 128. Valve body 120 is secured to pressure tube 30 and end cap 54 by press fitting or by other methods known well in the art. End cap 54 is secured to reservoir tube 36 and it defines a plurality of fluid passages 130 which allow communication between reservoir chamber 52 and base valve assembly 38. Valve body 120 defines a plurality of intake or rebound fluid passages 132, a plurality of compression passages 134, and a central bore 138. Retaining bolt 126 extends through central bore 138 and threadingly engages retaining nut 128 to secure both intake valve assembly 122 and compression valve assembly 124 to valve body 120.

Rebound check valve assembly 122 comprises a valve disc 140 and a valve spring 142. Valve disc 140 is an annular member which defines an internal bore 144 for allowing fluid flow to reach compression passages 134 as described below. Valve disc 140 is biased against the upper surface of valve body 120 by valve spring 142 which is located between valve disc 140 and retaining nut 128. Valve disc 140 closes the plurality of rebound fluid passages 132. During a rebound stroke of shock absorber 20, fluid pressure decreases in lower working chamber 46 until the fluid pressure within reservoir chamber 52 and rebound fluid passages 132 is capable of overcoming the biasing force of valve spring 142. When the biasing force exerted by valve spring 142 is exceeded by fluid pressure acting against valve disc 140, valve disc 140 is moved away from valve body 120 to allow fluid flow from reservoir chamber 52 to lower working chamber 46.

Compression valve assembly 124 comprises one or more mid/high speed valve discs 150, one or more ported restriction discs 152 and one or more variable orifice bleed discs 154. Discs 150, 152 and 154 are stacked together and located adjacent to valve body 120 with mid/high speed valve disc 150 abutting valve body 120, ported restriction disc 152 abutting mid/high speed valve disc 150 and variable orifice bleed disc 154 abutting ported restriction disc 152. Discs 150, 152 and 154 are held in position by being sandwiched between a shoulder 156 located on retaining bolt 126 and the lower surface of valve body 120. Retaining bolt 126 is secured to valve body 120 by retaining nut 128.

During a compression stroke, fluid pressure increases in lower working chamber 46 causing a fluid pressure decrease in upper working chamber 44 causing a pressure imbalance between lower working chamber 46 and reservoir chamber 52. This pressure imbalance will cause fluid flow to begin through the low speed oil flow circuit defined by compression valve assembly 124. Fluid pressure builds up in lower working chamber 46 until such a time that the fluid pressure in lower working chamber 46 acts against valve disc 154 and overcomes the load necessary to deflect disc valve 154 and allow fluid flow between lower working chamber 46 and reservoir chamber 52. Once the low speed oil flow circuit is saturated by fluid flow rate, fluid pressure builds up in lower working chamber 46 until the pressure acting against the mid/high speed valve discs 150 overcomes the load required to deflect discs 150 and allow fluid flow from lower working chamber 46 to reservoir chamber 52.

Figures 6, 6A:
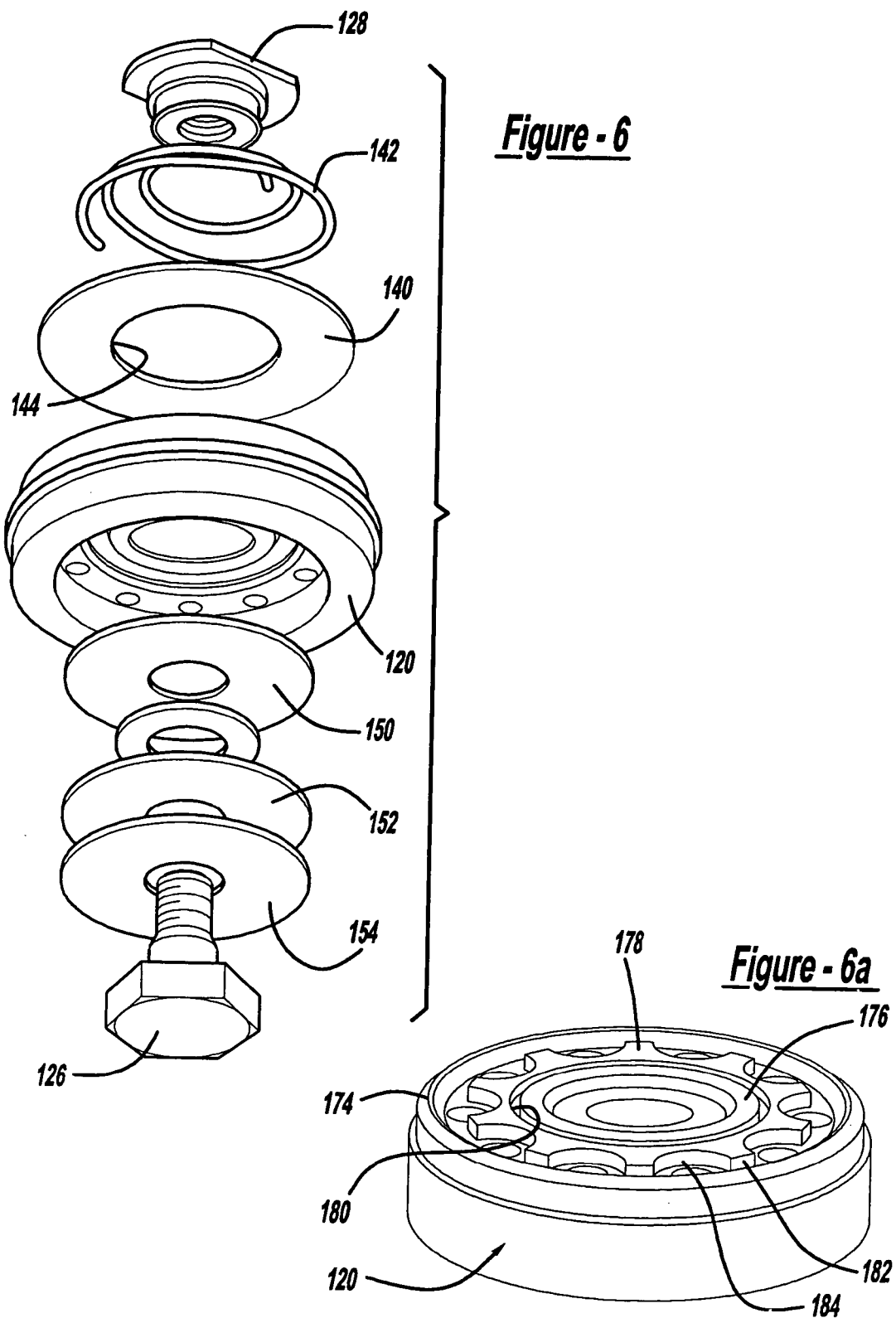
FIG. 6 is an exploded perspective view of the rebound check valve assembly shown in FIG. 5.
FIG. 6a is a perspective view of the valve body in the rebound check valve assembly shown in FIGS. 5 and 6.

Referring now to FIGS. 5 and 6, rebound check valve assembly 122 is designed to provide a low restriction to the flow of fluid from reservoir chamber 52 to lower working chamber 46, and it is designed to maximize the working surface for lifting valve disc 140. Valve body 120 defines a first or outer land 174, a second or inner land 176, and a support surface 178 disposed between outer land 174 and inner land 176. Support surface 178 is defined by an inner diameter 180, which is adjacent inner land 176, and a scalloped outer surface 182, which defines a plurality of indentations 184, which partially surround each of the plurality of rebound passages 132 to maximize the surface area of support surface 178. Valve disc 140 is biased by valve spring 142 against outer land 174 and inner land 176. A clearance is provided between support surface 178 and valve disc 140. This clearance maximizes the working surface during the rebound stroke by allowing fluid pressure in reservoir chamber 52 to react against the surface are of valve disc 140, which is between outer land 174 and inner land 176. This provides for a low level of intake restriction for rebound check valve assembly 122. During a compression stroke, fluid pressure within lower working chamber 46 reacts against the upper surface of valve disc 140. Due to valve disc 140 being designed thin to reduce its weight, valve disc 140 will deflect in the area between outer land 174 and inner land 176 to contact support surface 178, which provides additional support for valve disc 140. Support surface 178 supports valve disc 140 during the rebound stroke to minimize the unsupported span of valve disc 140 by distributing the load over all lands 174 and 176, as well as the entire surface area of support surface 178.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:
   a pressure tube forming a working chamber;
   a reservoir tube disposed around said pressure tube, said reservoir tube forming a reservoir chamber between said pressure tube and said reservoir tube;
   a base valve assembly disposed between said working chamber and said reservoir chamber, said base valve assembly comprising;
   a valve body defining a fluid passage, said valve body defining a first land, a second land disposed radially inward from said first land, and a support surface disposed between said first and second lands; and
   a valve disc disposed adjacent said valve body, said valve disc abutting said first and second lands, said valve disc being movable between a first position where said valve disc contacts said first and second lands and forms a clearance with said entire support surface and a second position where said valve disc contacts said first and second lands and said support surface.

2. The damper according to claim 1 wherein said first and second lands are annular in shape.

3. The damper according to claim 2 further comprising a biasing member for urging said valve disc towards said valve body.

4. The damper according to claim 2 wherein said support surface defines a circular inner edge.

5. The damper according to claim 4 wherein said support surface defines a scalloped outer edge.

6. The damper according to claim 2 wherein said support surface defines a scalloped outer edge.

7. The damper according to claim 1 further comprising a biasing member for urging said valve disc towards said valve body.

8. The damper according to claim 1 wherein said support surface defines a circular inner edge.

9. The damper according to claim 8 wherein said support surface defines a scalloped outer edge.

10. The damper according to claim 1 wherein said support surface defines a scalloped outer edge.

11. A damper comprising:
    a pressure tube forming a working chamber;
    a piston disposed within said working chamber, said piston dividing said working chamber into an upper working chamber and a lower working chamber, said piston defining a first land, a second land disposed radially inward from said first land and a support surface disposed between said first and second lands; and
    a valve disc disposed adjacent said piston, said valve disc abutting said first and second lands, said valve disc being movable between a first position where said valve disc contacts said first and second lands and forms a clearance with said entire support surface and a second position where said valve disc contacts said first and second lands and said support surface.

12. The damper according to claim 11 wherein said first and second lands are annular in shape.

13. The damper according to claim 12 further comprising a biasing member for urging said valve disc towards said valve body.

14. The damper according to claim 12 wherein said support surface defines a circular inner edge.

15. The damper according to claim 14 wherein said support surface defines a scalloped outer edge.

16. The damper according to claim 12 wherein said support surface defines a scalloped outer edge.

17. The damper according to claim 11 further comprising a biasing member for urging said valve disc towards said valve body.

18. The damper according to claim 17 wherein said support surface defines a circular inner edge.

19. The damper according to claim 18 wherein said support surface defines a scalloped outer edge.

20. The damper according to claim 11 wherein said support surface defines a scalloped outer edge.

* * * * *